United States Patent [19]

Kyushima et al.

[11] Patent Number: 6,055,627

[45] Date of Patent: Apr. 25, 2000

[54] COMPILING METHOD OF ACCESSING A MULTI-DIMENSIONAL ARRAY AND SYSTEM THEREFOR

[75] Inventors: Ichiro Kyushima; Masahiro Kainaga, both of Yokohama, Japan

[73] Assignee: Hitachi, Ltd., Tokyo, Japan

[21] Appl. No.: 08/078,630

[22] Filed: Jun. 16, 1993

[30] Foreign Application Priority Data

Jun. 22, 1992 [JP] Japan .................................. 4-162519

[51] Int. Cl.$^7$ ...................................................... G06F 9/06
[52] U.S. Cl. ............................................. 712/233; 712/234
[58] Field of Search ................................... 395/650, 700, 395/375; 712/223, 224, 225, 226

[56] References Cited

U.S. PATENT DOCUMENTS

| | | | |
|---|---|---|---|
| 4,773,007 | 9/1988 | Kanada et al. | 395/700 |
| 4,833,606 | 5/1989 | Iwasawa et al. | 395/700 |
| 5,036,454 | 7/1991 | Rau et al. | 395/700 |
| 5,067,068 | 11/1991 | Iwasawa et al. | 395/650 |
| 5,109,331 | 4/1992 | Ishida et al. | 395/375 |
| 5,151,991 | 9/1992 | Iwasawa et al. | 395/700 |
| 5,274,812 | 12/1993 | Inoue | 395/700 |

OTHER PUBLICATIONS

Partitioning and Labelling of Loops by Unimodular Transformation, By Erik H. D'Hollander, IEEE 1992 publication.

Sasaki, Masataka. "Programming Language Processing System," Iwanami Lecture Software Science, vol. 5, 1989, pp. 459–493. (Japanese).

Kasahara, Hirotoku. "Parallel Processing Techniques," Corona Inc., 1991, pp. 113–128. (Japanese).

Aho, Alfred V., et al. "Compilers—Principles, Techniques, and Tools," Science, Inc., Addison–Wesley Publishing Company, 1986, pp. 81–129. (English).

*Primary Examiner*—Zarni Maung
*Attorney, Agent, or Firm*—Beall Law Offices

[57] ABSTRACT

Particular portions of a program is determined to execute repeatedly. Array references accessed in a loop are classified to groups of equal values on the basis of reference to the same array. Of the groups, the ones for which an array transposition can use a batch load or store instruction are selected. An array corresponding to the selected groups is transposed to generate an intermediate language for copying. Reference to the elements of the array before the transposition is changed to reference to the transposition array. This makes it possible to convert the loop so that a single instruction can be used for a processor which can load into a register two data having consecutive addresses in a memory with use of the instruction.

8 Claims, 15 Drawing Sheets

FIG. 4

```
int  a[300] [200];                              ~(401)

main( )                                         ~(402)
{                                               ~(403)
    int i,j,k;                                  ~(404)
    for(i=0;i<1024;i++)                         ~(405)
        for(j=0;j<200;j++)                      ~(406)
            for(k=0;k<300;k++) {                ~(407)
                a[k] [j] =a[k+1] [j-1] ;        ~(408)
            }                                   ~(409)
}                                               ~(410)
```

FIG. 5

| KIND | LEXICON |
|---|---|
| keyword | int |
| id | a |
| punc | [ |
| num | 300 |
| punc | ] |
| punc | [ |
| num | 200 |
| punc | ] |
| . . . | . . . |
| punc | } |
| punc | EOF |

FIG. 6

| NAME | OCCURRENCE POSITION | TYPE | TRANSPOSITION FLAG |
|---|---|---|---|
| a | OUT OF THE FUNCTION | array(int, 300, 200) | OFF |
| main | OUT OF THE FUNCTION | func | OFF |
| i | IN THE FUNCTION | int | OFF |
| j | IN THE FUNCTION | int | OFF |
| k | IN THE FUNCTION | int | OFF |

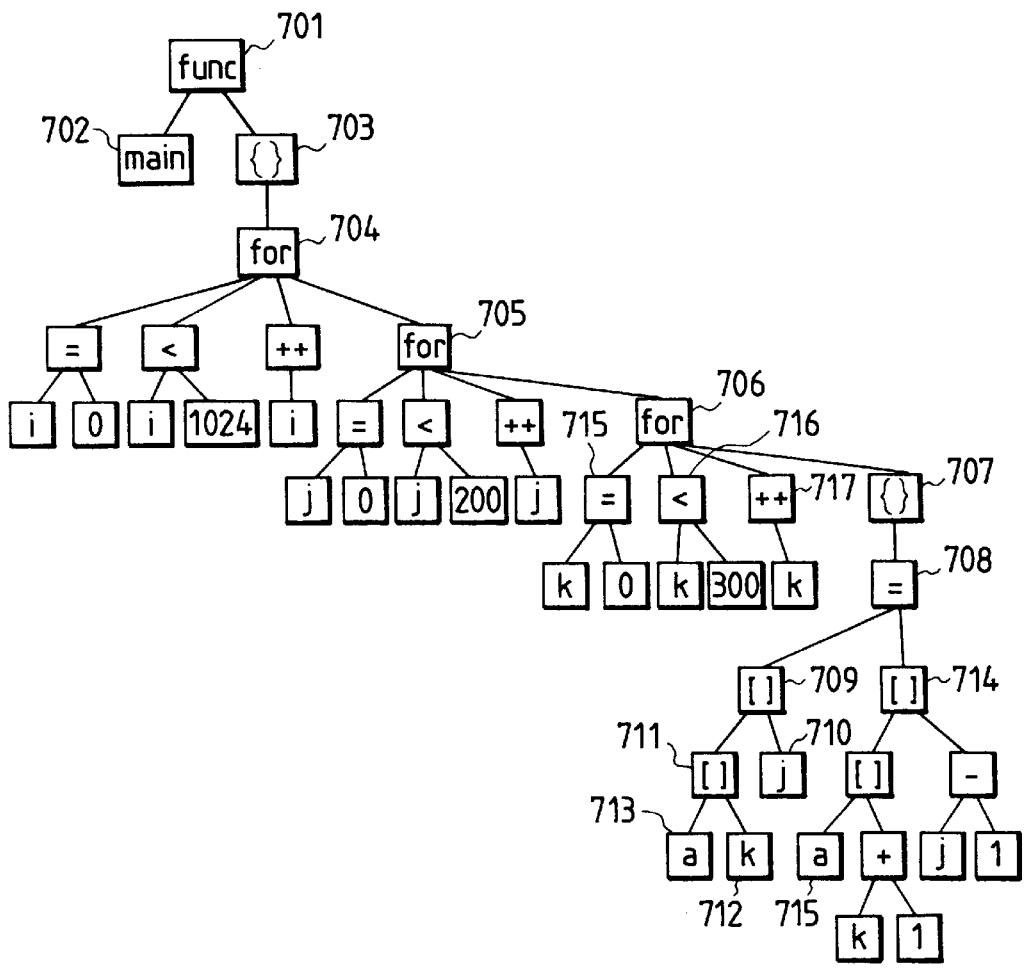

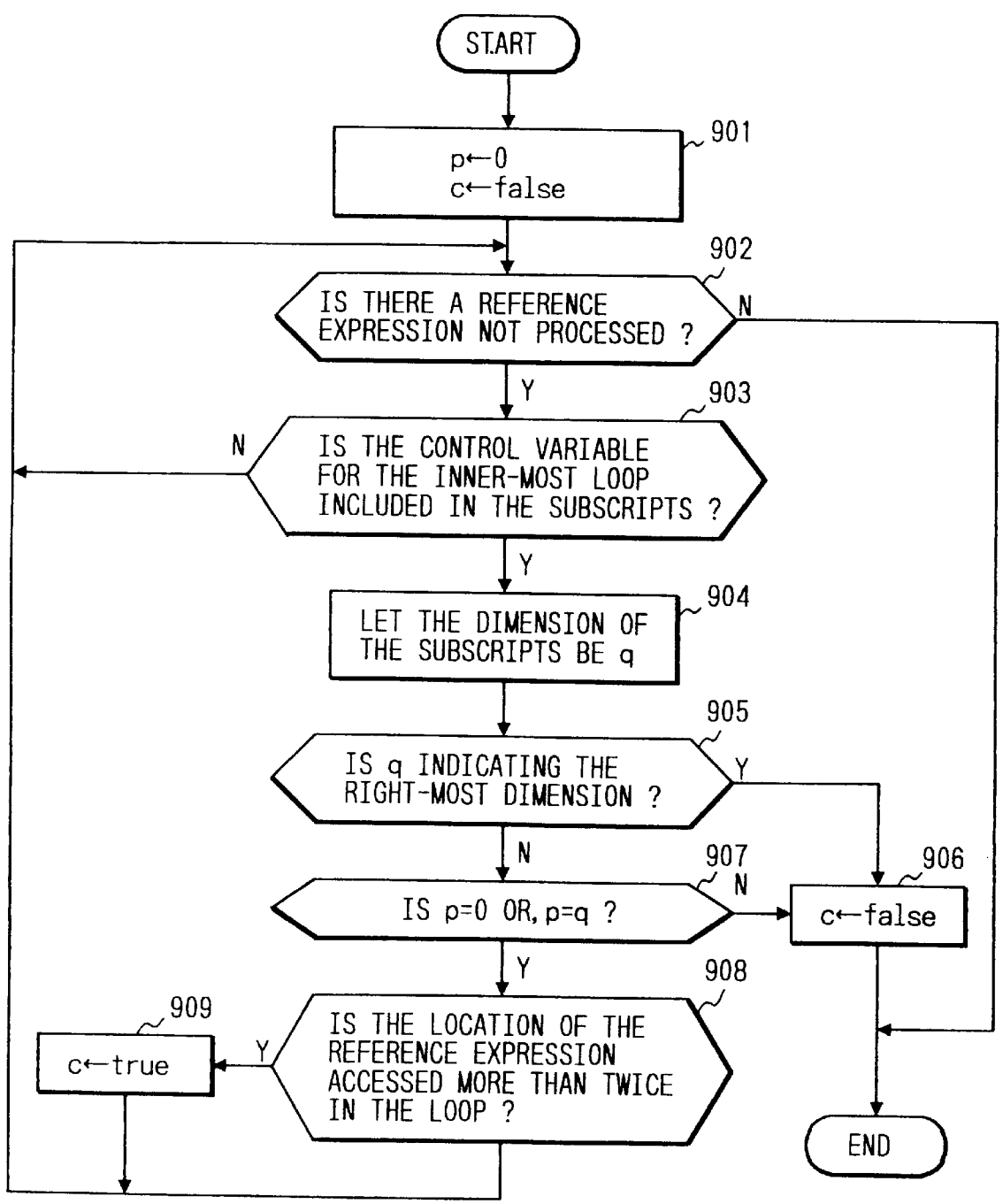

FIG. 10

| LOOP NUMBER 1001 | NODE 1002 | CONTROL VARIABLE 1003 | CHILD LOOP LIST 1004 | EXECUTION STATEMENT NODE LIST 1005 | NUMBER OF REPETITION 1006 |
|---|---|---|---|---|---|
| 1 | 704 | i | (2) | φ | 1024 |
| 2 | 705 | j | (3) | φ | 200 |
| 3 | 706 | k | φ | (708) | 300 |

FIG. 11

| NAME 601 | OCCURRENCE POSITION 602 | TYPE 603 | TRANSPOSITION FLAG 604 | TRANSPOSITION ARRAY 607 | TRANSPOSITION DIMENSION 608 |
|---|---|---|---|---|---|
| a | OUT OF THE FUNCTION | array(int, 300, 200) | ON | ta | 1 |
| main | OUT OF THE FUNCTION | func | OFF | — | — |
| i | IN THE FUNCTION | int | OFF | — | — |
| j | IN THE FUNCTION | int | OFF | — | — |
| k | IN THE FUNCTION | int | OFF | — | — |
| ta | OUT OF THE FUNCTION | array(int, 200, 300) | OFF | — | — |

```
int  a[300] [200] ;                      ~(1201)
int  ta[200] [300] ;                     ~(1202)

main( )                                  ~(1203)
{                                        ~(1204)
    int i, j, k;                         ~(1205)
    tcopy(ta, a)                         ~(1206)
    for(i=0; i<1024; i++)                ~(1207)
        for (j=0; j<200; j++)            ~(1208)
            for (k=0; k<300; k++) {      ~(1209)
                ta[j] [k] =ta [j-1] [k+1] ;   ~(1210)
            }                            ~(1211)
    tcopy (a, ta) ;                      ~(1212)
}                                        ~(1213)
```

FIG. 15

```
for(i1=0;i1<300;i1++)                    ~(1501)
    for(i2=0;i2<200;i2++)                ~(1502)
        ta[i2][i1]=a[i1][i2];            ~(1503)
```

(a) a から ta へのコピー

```
for(i1=0;i1<300;i1++)                    ~(1504)
    for(i2=0;i2<200;i2++)                ~(1505)
        a[i1][i2]=ta[i2][i1];            ~(1506)
```

```
int  a[300][200];                    ~(1601)

main( )                              ~(1602)
{                                    ~(1603)
    int  i, j, k;                    ~(1604)
    for (i=0; i<1024; i++)           ~(1605)
        for (j=0; j<200; j++)        ~(1606)
            for (k=0; k<300; k+=2) { ~(1607)
                a[k][j]=a[k+1][j-1]; ~(1608)
                a[k+1][j]=a[k+2][j-1]; ~(1609)
            }                        ~(1610)
}                                    ~(1611)
```

FIG. 17

```
int   a[300][200];                    ~(1701)
int   ta[200][300];                   ~(1702)

main()                                ~(1703)
{
    int i, j, k;                      ~(1704)
    tcopy(ta, a);                     ~(1705)
    for(i=0; i<1024; i++)             ~(1706)
        for(j=0; j<200; j++)          ~(1707)
            for(k=0; k<300; k+=2) {   ~(1708)
                ta[j][k]=ta[j-1][k+1];   ~(1709)
                ta[j][k+1]=ta[j-1][k+2]; ~(1710)
            }                         ~(1711)
    tcopy(a, ta);                     ~(1712)
}                                     ~(1713)
```

NO TRANSPOSITION

AFTER TRANSPOSITION

COMPILING METHOD OF ACCESSING A MULTI-DIMENSIONAL ARRAY AND SYSTEM THEREFOR

BACKGROUND OF THE INVENTION

1. Field of the Invention

The present invention relates to a method and system for loop conversion. More particularly, it concerns a method and system for loop conversion for generating object code to execute a loop for accessing a multi-dimensional array at high speed for use in a processor having an instruction for loading or storing two data at a time.

1. Description of the Prior Art

Many optimization techniques for increasing the efficiency of executing object code generated by a compiler have been proposed. Of these techniques, optimization of loops is particularly important because a loop is executed at a high frequency in a program and occupies a high percentage of the execution time. The prior loop optimization techniques are described, for example by Masataka Sasaki in the "Programming Language Processing System", Iwanami Lecture Software Science, Vol. 5, pp. 459–493, 1989, and by Hirotoku Kasahara in the "Parallel Processing Techniques", Corona Inc., pp. 113–128, 1991.

On the other hand, with respect to hardware, there have been many methods for making the speed of the object code faster. One of the methods uses a super scalar processor. The super scalar processor fetches a plurality of, for example two or four, consecutive instructions at a time and if these instructions are executable in parallel, executes them in parallel.

For the super scalar method, it is necessary that the object program to be executed has enough parallelism to make the processor execute at high speed. The reason for this is that the super scalar processor executes instructions in parallel only when possible. For example, if a value calculated with an instruction is used with the next instruction, the two instructions cannot be executed in parallel. There is a case that a program written in a high-level language, such as FORTRAN or C, is compiled to execute with the super scalar processor. In that case, if the source program does not have parallelism explicitly, it may be optimized so parallelism is achieved when the compiler translates the source program to machine language. Parallelism is particularly important in loops contained in the program.

As an example, let us discuss the following triple nested loop in FORTRAN.

$$\text{DO 8 I} = 1, 256 \tag{1}$$

$$R(I, I) = 1.D0 / R(I, I) \tag{2}$$

$$\text{DO 8 J} = I + 1, 256 \tag{3}$$

$$R(J, I) = R(J, I) * R(I, I) \tag{4}$$

$$\text{DO 8 K} = I + 1, 256 \tag{5}$$

$$R(J, K) = R(J, K) - R(J, I) * R(I, K) \tag{6}$$

$$\text{8 CONTINUE} \tag{7}$$

In the execution of this program statement (6), which is the innermost statement nested in the loop, is executed at the highest frequency. It is most effective to optimize, or parallelize, statement (6) of the program. Statement (6) is executed by the following five instructions, with array address calculation omitted.

$$\text{Load } R(J, K) \tag{8}$$

$$\text{Load } R(I, K) \tag{9}$$

$$\text{Calculate } R(J, I) * R(I, K) \tag{10}$$

$$\text{Calculate } R(J, K) - (\text{Result of } (10)) \tag{11}$$

$$\text{Store (Result of } (11)) \text{ into } R(J, K) \tag{12}$$

R(J, I) is not loaded because the value of the expression is first loaded outside the loop once. Therefore, it not necessary to load it within the loop since the value will not change.

Of the above five instructions, only instructions (8) and (9) can be executed in parallel. The others cannot be executed in parallel since these all use the results of the preceding instructions. This means that the above program execution does not make the most of the characteristics of the super scalar processor which can issue a plurality of instructions at one time.

Loop unrolling is one of the techniques for drawing parallelism from such a program. It is an optimizing technique in that the contents of the loop are plurally copied to unroll or reduce the number of loop repetitions and at the same time, increase the number of independent instructions. As an example, the innermost loop in the program cited above can be unrolled two times as follows. (Only the innermost loop is shown. Note that the value of "K" is increased by two.)

$$\text{DO 8 K} = I + 1, 256, 2 \tag{13}$$

$$R(J, K) = R(J, K) - R(J, I) * R(I, K) \tag{14}$$

$$R(J, K+1) = R(J, K+1) - R(J, I) * R(I, K+1) \tag{15}$$

$$\text{8 CONTINUE} \tag{16}$$

In the unrolling, the instruction strings executed by statements (14) and (15) are as follows.

$$\text{Load } R(J, K) \tag{17}$$

$$\text{Load } R(I, K) \tag{18}$$

$$\text{Calculate } R(J, I) * R(I, K) \tag{19}$$

$$\text{Calculate } R(J, J) - (\text{Result of } (19)) \tag{20}$$

$$\text{Store (Result of } (20)) \text{ into } R(J, K) \tag{21}$$

$$\text{Load } R(J, K+1) \tag{22}$$

$$\text{Load } R(I, K+1) \tag{23}$$

$$\text{Calculate } R(J, I) * R(I, K+1) \tag{24}$$

$$\text{Calculate } R(J, K+1) - (\text{Result of } (24)) \tag{25}$$

$$\text{Store (Result of } (25)) \text{ into } R(J, K+1) \tag{26}$$

Of these instructions, (17) and (22), (18) and (23), (19) and (24), and so on are independent from each other. They therefore can be (logically) executed in parallel. That is, loop unrolling can increase the parallelism of the program.

However, even if the instructions are logically executable in parallel, hardware restrictions may limit such execution. In other words, if two instructions compete for use of the same execution units, such as an adder, multiplier, and memory port, the two instructions cannot be executed in parallel. Such instructions, for example, include an add instruction and another add instruction, a load instruction and another load instruction, or a load instruction and a store instruction. Of the above-mentioned instruction strings, (17)

and (22), (18) and (23), and so on cannot be physically executed in parallel as they are both load instructions. As six of the ten instruction strings from (17) to (26) are load or store instructions, the program cannot obtain sufficient parallelism. In general, it frequently occurs that programs have a bottleneck in such load and store instructions.

In order to solve such a problem, we may use a processor having an instruction for loading or storing two data at a time. (Note that the data to be loaded or stored must be consecutively arranged in the memory. Also, note that both loading and storing cannot be executed at the same time.) With use of the instruction, the number of the load and store instructions can be reduced. This, therefore, can reduce the possibility of competition for the execution units (memory port).

For the instruction mentioned above which loads or store two data at a time, the data to be loaded or stored must be arranged in a consecutive area in the memory. Even if the loop unrolling is made, however, the data to be loaded or stored are not always consecutively arranged.

For example, of the instruction strings (17) to (26) after the loop unrolling, the four data to be loaded are R(J, K), R(J, K+1), R(I, K), and R(I, K+1). These data are not consecutive in the memory. This is because references to the former two data and the latter two data of the four data have right-hand subscripts that change consecutively. In multi-dimensional arrays of FORTRAN, the leftmost subscripts are arrayed to change in the memory as R(1, 1), R(2, 1), R(3, 1), and so on. (On the contrary, in the C language, the rightmost subscripts are arrayed to change.) In addition, there are two data to be stored, including R(J, K) and R(J, K+1). These are also are not located consecutively in memory. The example program cannot effectively use the instruction for loading or storing two data at a time under these circumstances. Therefore, the bottleneck in the load and store instruction is still not solved.

Another method for solving the bottleneck problem is an optimization technique called loop interchange, which is described in the document mentioned above. The loop interchange is a technique in which an inner and outer loop of a multi-loop are transposed. However, this technique cannot be applied to all loops. It cannot be applied if the loop interchange changes meaning (execution results) of the program. For the loop in the example, the meaning of the program is changed when the inner and outer loops are interposed.

SUMMARY OF THE INVENTION

In view of the foregoing, it is an objective of the present invention to provide a method and system for loop conversion which effectively uses a processor instruction for loading or storing two data at a time in a loop accessing a multidimensional array. This reduces the number of load and store instructions.

Briefly, the foregoing objective is accomplished in accordance with aspects of the present invention by a method and system for loop conversion. In an information processing system having a processing apparatus and a memory, the method and system for loop conversion is featured by generating instructions for executing at least one instruction for loading and storing data formed of a plurality of array elements which are continuously arranged in one dimension in a memory space of the memory and are arrayed in a plurality of dimensions, with use of the processing apparatus; in recognizing a loop nest within codes containing the instructions; in transposing and copying the array element between at least two dimensions so that the data arrayed in the plurality of dimensions within the loop nest should be continuously arrayed in the memory space as to the one dimension; and in converting an access code to source array elements within the loop nest to an access code to array elements in the copy target.

That is, the foregoing objective is accomplished by re-arraying the contents of the array so that the array elements continuously accessed in the loop can also be continuously arrayed in the memory. In other words, the foregoing objective is accomplished by the manner in which the array elements accessed continuously with time in the loop nest select the array which is not continuously accessed spatially, the code for copying the whole selected array to a different array is inserted in front of the loop nest, the access code to the source array elements in the loop nest is converted to an access code to the target array elements, and if necessary, the code for recopying the array at the copy target to the original array is inserted behind the loop nest.

In the copying procedure mentioned above, if the subscripts of the first (leftmost) dimension are arrayed in the memory space so as to consecutively change, as in FORTRAN, and if the subscript of the ith (i is not 1) dimension is accessed while changing consecutively, copying is made from the n-dimensional source array A to the n-dimensional destination array B so that A (I1, I2, ... Ii ..., In)=B (Ii, I2, ..., I1, ... In) is held for all array elements where A is the source array, B is the destination array, and I is a natural number.

On the other hand, if the subscripts of the last (rightmost) dimension are arrayed in the memory space so as to consecutively change as in the C language, copying is made from the n-dimensional source array A to the n-dimensional destination array B so that A (I1, I2, ..., Ii, ... In)=B (I1, I2, ..., In, ..., Ii) is held for all the array elements.

In the step for selecting the above-mentioned array, the array is selected in which all the array elements are accessed two or more times in the loop nest.

The present invention constructed as described above operates as follows.

The loop mentioned in the description of the prior art is referred to as an example for describing the operation of the present invention. After the loop unrolling, the array elements accessed by a single repetition of the deepest loop are R(J, K), R(J, K+1), R(I, K), and R(I, K+1). The subscript of the second (right-hand) dimension in the array changes. In the two-dimensional array of FORTRAN, on the other hand, the subscript of the first (lefthand) dimension is arrayed in the memory space so as to change at the highest rate.

First, the code for exchanging the first and second subscripts of the original array R before copying it to a different array X is inserted just before the object loop. Second, if there is a location of the element of the array R to be referred to, replacement is made so that the element of the array X corresponding to it can be referred to. For example, R(J, K) is replaced by X(K, J). With the replacement, the object loop is converted as shown below.

```
D0 8 I = 1, 256
    X(I, I) = 1.D0/X(I, I)
    D0 8 J = I + 1, 256
        X(I, J) = X(I, J) * X(I, I)
        D0 8 K = I + 1, 256, 2
            X(K, J) = X(K, J) – X(I, J) * X(K, I)
            X(K + 1, J) = X(K + 1, J) – X(I, J) * X(K + 1, I)
8 CONTINUE
```

The code for exchanging the first and second subscripts of the array X before copying it to the original array R is inserted just after the object loop.

After the loop conversion, the four data loaded in the innermost portion of the object loop are X(K, J), X(K+1, J), X(K, I) and X(K+1, I). These data are arrayed in the respective consecutive areas of the memory. Therefore, as an example, X(K, J) and X(K+1, J) and X(K, I) and X(K+1, I) can be loaded simultaneously. The number of necessary load instructions can be halved. Similarly, the number of necessary store instructions can be halved.

The loop conversion described above involves an overhead due to copying since the codes for copying the array are inserted before and behind the object loop nest. However, each of the elements of the object loop nest is accessed 256 times since the object loop is the third nested loop, while when copying the X array all the elements of that array are accessed only once. The overhead of the array copying can be ignored since accessing the array elements in the object loop nest is more critical in the execution time.

The foregoing and other objectives, advantages, manner of operation and novel features of the present invention will be understood from the following description when it is read in connection with the accompanying drawings.

BRIEF DESCRIPTION OF THE DRAWINGS

In the accompanying drawings:

FIG. 4 depicts an example of a program;

FIG. 5 depicts results of a lexical analysis of the program in FIG. 4;

FIG. 6 depicts an example of the symbol table;

FIG. 7 depicts an example of the intermediate language;

FIG. 8 depicts an array element reference table;

FIG. 9 depicts a flow chart for judging whether the array is transposed or not;

FIG. 10 depicts a loop table;

FIG. 11 depicts the symbol table after array transposition;

FIG. 12 depicts a program image after conversion;

FIG. 15 depicts a process for tcopy node;

FIG. 16 depicts a loop unrolling of the program in FIG. 4;

FIG. 17 depicts the loop unrolling of the program in FIG. 12; and

DETAILED DESCRIPTION OF THE PREFERRED EMBODIMENT

The following describes, in detail, embodiments according to the present invention by reference to the accompanying drawings.

Figure 2:
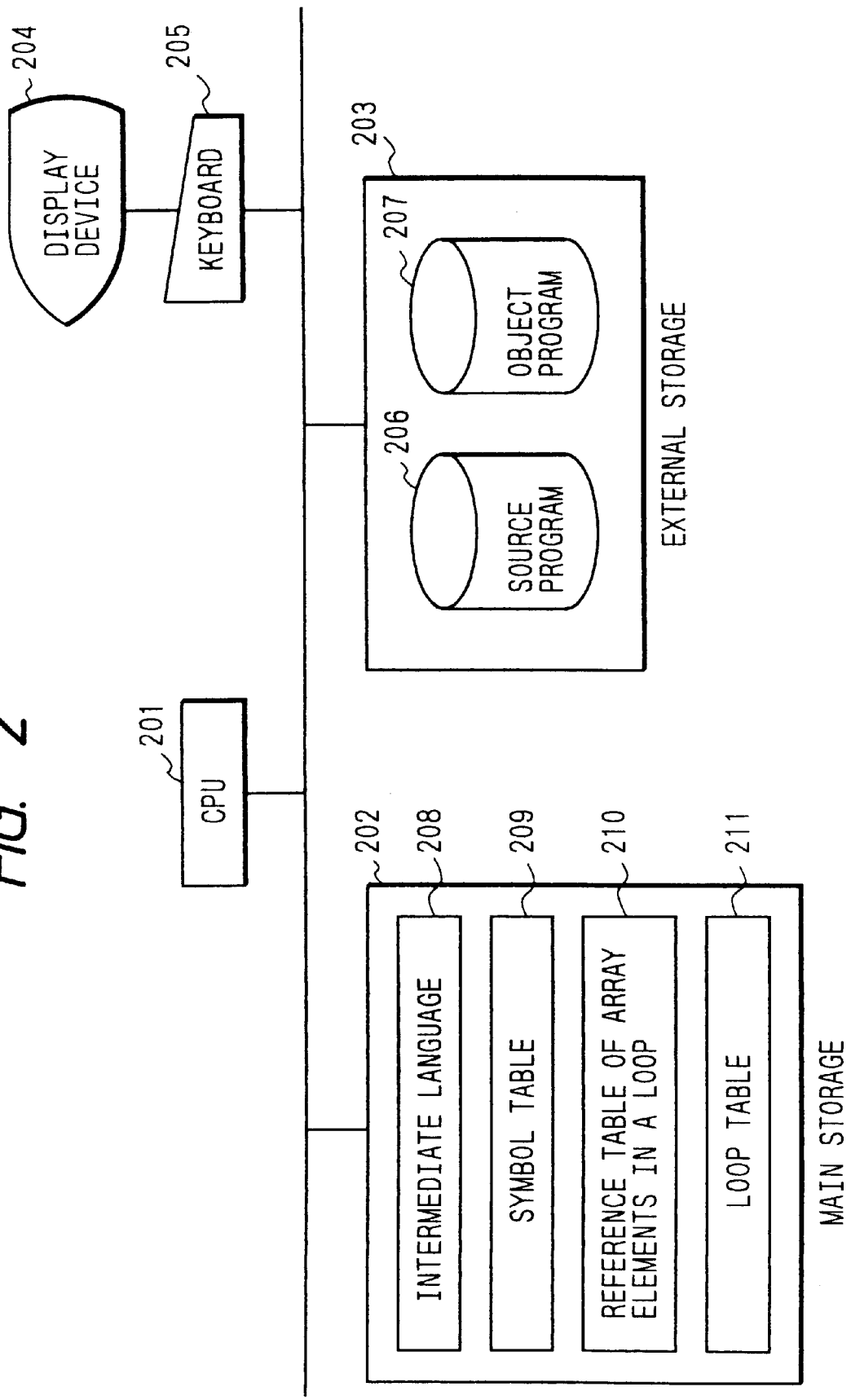
FIG. 2 depicts a construction of a computer system in which a compiler of the present invention runs.

FIG. 2 depicts a block diagram illustrating a computer system based on the present invention in which the C compiler runs. The computer system comprises a CPU 201, a main storage 202, an external storage 203, a display device 204 and a keyboard 205. The keyboard 205 allows a user to enter a compiler start command. The display 204 shows a compile end message or an error message. The external storage 203 stores a source program 206 and an object program 207. The main storage 202 stores an intermediate language 208, a symbol table 209, a reference table 210 of array elements in a loop and a loop table 211 which are needed in a compiling process. The CPU 201 control the compiling process.

Figure 3:
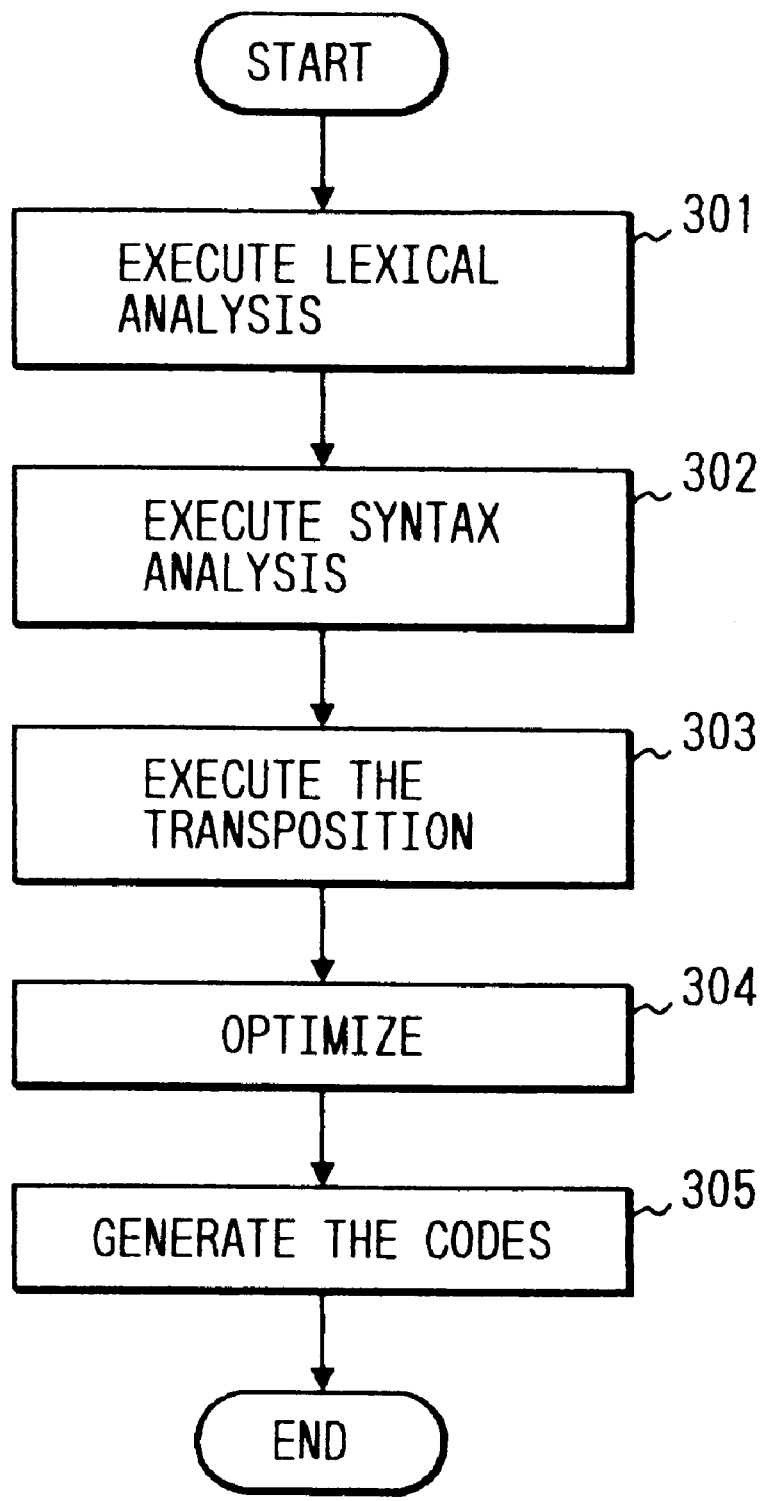
FIG. 3 depicts a flow chart for a compiling process.

FIG. 3 depicts a flow chart illustrating the compiling process. The compiling process is carried out in an order of a lexical analysis 301, a syntax analysis 302, a transposition 303, an optimization 304 and a code generation 305. The lexical analysis 301, the syntax analysis 302, the optimization 304 and the code generation 305 are the same as in the usual compiling process. The following briefly describes these steps.

(Step 301)

The lexical analysis in step 301 arranges the C source program stored in mere character strings to lexicon (word) strings. A method for the lexical analysis is described, for example in the "Compiler I—Principles, Techniques and Tools," Science Inc., by Aho, et al.

FIG. 4 depicts an example of the C source program. This is lexically analyzed to lexicon strings as shown in FIG. 5. In FIG. 5, each of the words is represented by a set of kind 501 and lexicon 502. The words are arranged in order of occurrence in the source program. Keywords of the kind include a keyword for the program an "id" for identifier, a "punc" for punctuation and a "num" for number.

(Step 302)

Step 302 analyzes the lexicon strings. The syntax analysis is different in the process depending on a statement which is a declaration or execution. For the declaration statement, the identifier declared is registered in the symbol table 209. For the execution statement, the intermediate language 208 is created. A method for the syntax analysis, a method for creating the symbol table 209 and a method for creating the intermediate language 208 are also described in the "Compiler I—Principles, Techniques and Tools" mentioned above.

FIG. 6 is an example of the symbol table 209, which corresponds to the program in FIG. 4. Data registered in the symbol table 209 in FIG. 6 include names 601, occurrence positions 602, types 603 and transposition flags 604. The names 601 are names of the identifiers. The occurrence positions 602 are positions at which the identifiers are declared, or positions in or out of the function. The types 603 represent types of the identifiers. As an example, "array (int, 200, 300)" represents a type of "(two-dimensional) array in which an element type is an integer and the number of elements is 300*200." The transposition flags 604 are flags set at the transposing step 303, which as will be described later, are initially set to "OFF".

FIG. 7 depicts an example of the intermediate language 208, which also corresponds to the program in FIG. 4. In the figure, the intermediate language 208 is represented by a tree. The tree is a set of nodes and edges. In the memory of the computer, each of the nodes is represented by a memory area of fixed or variable length, and each of the edges is represented by a pointer indicating an address of the area. In the figure, however, the node is represented by a square, and the edge by a connecting line between the nodes. Each node points to one parent node and zero or more child nodes. Note that only a special node, called the route, points to no parent node. In the figure, the edge extending upward from the node points to the parent node and the edge extending downward points to the child note. The children are called the first child, the second child, and so on from the left. As an example, the parent node of "{ }" 703 is "func" 701, and the child node is "for" 704. The route node is "func" 701. The tree is used in many compilers since it is suitable to represent a logical structure of the program.

(Step 303)

Step 303 executes the transpositioning process, which will be described in detail later.

(Step 304)

Step 304 scans the execution statements represented in the tree structure and optimizes the program by finding redundant portions to delete. The optimization step is also described in the "Compiler I—Principles, Techniques and Tools" mentioned above, and is described no more here as it has no relationship to the essence of the present invention.

(Step 305)

Step 305 generates the object program stated in assembly language before feeding it out to the object program 207. (There is a compiler that can generate an object module in machine language.) The symbol table generates a define area instruction and a define constant instruction in assembly language. The intermediate language generates a machine language instruction in assembly language. This code generation process also is described no more here as it has no relationship to the essence of the present invention.

The following describes the process at step 303 in detail which is a feature of the present invention.

Figure 1:
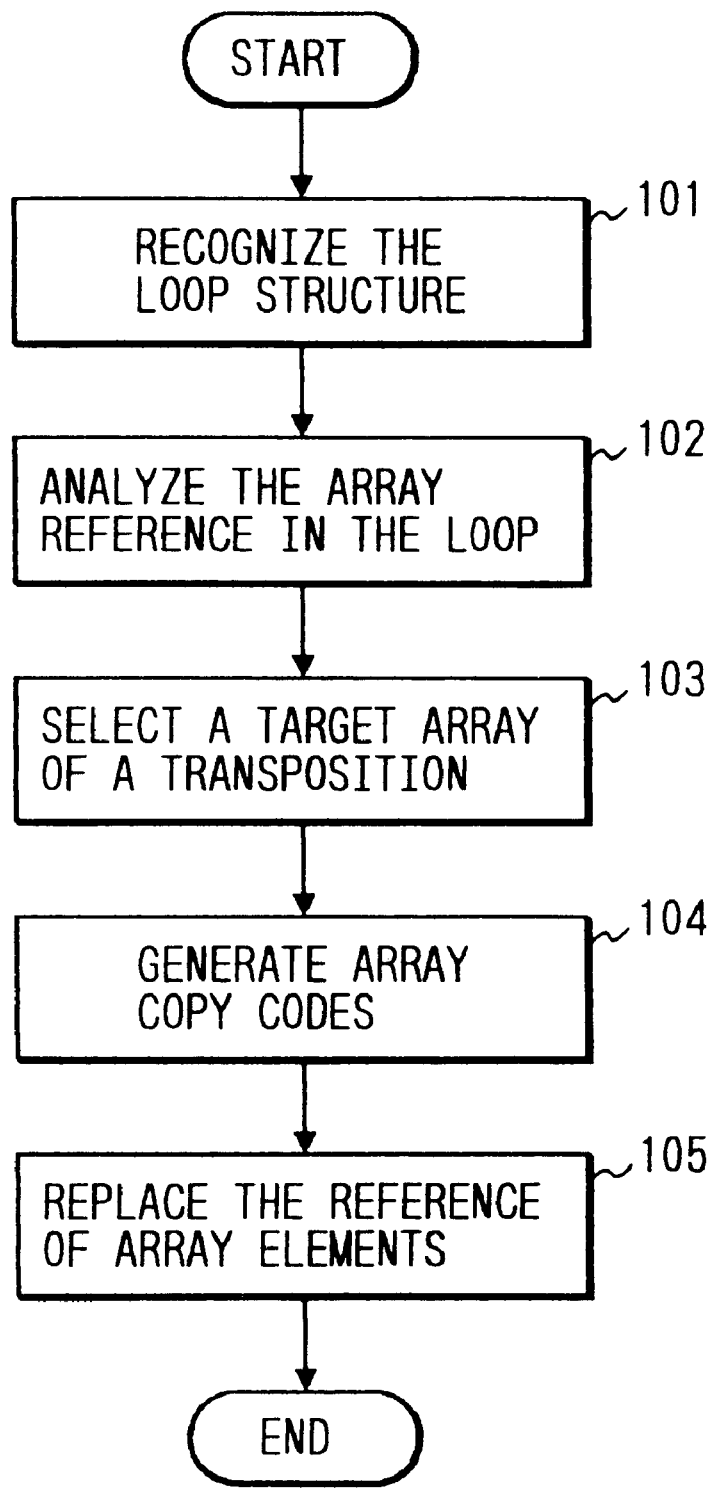
FIG. 1 depicts a flow chart for an array transposition.

FIG. 1 depicts a detailed flow chart of the transposition 303. The transposition process is carried out in the order of a loop structure recognition 101, an array reference analysis 102 in the loop, a transposition target array selection 103, and array copy code generation 104 and an array element reference replacement 105. The following describes these steps in detail.

(Step 101)

Step 101 recognizes the loop structure. This step scans the intermediate language to find the node representing the loop before recognizing a sentence which is repeatedly executed in the loop. (The sentence is hereinafter referred to as the loop execution statement.) The step then registers the statement in the loop table 211. The nodes representing the loop in the C language include "for" and "while". The loop structure recognition is described below by reference to the example of the intermediate language in FIG. 7. Scanning is started with the route of the tree. The "func" 701 represents a function definition. The first child represents a function name "main" 702, and the second child is a function body "{ }" 703. If scanning is moved to the second child "{ }" 703, then it finds a first statement "for" 704 which is a kind of loop node. Since the fourth statement represents the statement to be executed by the "for" node, scanning is moved to the fourth child. (The first child is an initial value setting statement, the second child is a repetition judging statement, and the third child is a control variable updating statement. These will be described later.) The fourth child "for" 705 is again a "for" node (a second "for" statement). When the scanning reaches the fourth child, there is a "for" node 706 (a third "for" statement). Scanning, then, is moved to a fourth child "{ }" 707. A child of the fourth child "{ }" 707 is an assignment node "=" 708. It is seen that the loop nest below 704 is a triple nested loop, and the loop executed statement is represented by node 708.

FIG. 10 depicts a structure of the loop table. For each of the loops, a loop number 1001, a node 1002, a control variable 1003, a child loop list 1004, an execution statement list 1005 and a number of repetition times 1006 are registered. The loop numbers 1001 are numbered with 1, 2, 3, and so on in the order of occurrence. The node is a node representing the loop. The loop control variable is a variable that is defined by the first child of the loop child, compared by the second child and added with only one (1) by the third child. In the case of the "for" node 706, for example, a variable "k" is defined by the first child "=" 715, compared by the second child "<" 716 and added with one by the third child "++" 717. The variable "k" is the loop control variable. The child loop list 1004 is a list of numbers of the loops which are directly contained in the loop. The execution statement list is a list of the execution statement nodes directly contained in the loop. The "for" node 706, for example, contains the assignment "=" node 708 as the execution statement. The number of repetition times is a range of the control value of "k", or the final value minus the initial value plus one (1). For the "for" node 706, as an example, the variable "k" takes the initial value of 0 and the final value of 299 as the loop is repeated while the "k" is less than 300. The number of repetition times, therefore, is 300. This ends the recognition of the loop structure.

(Step 102)

Next, are analyzed in step 102 the array references in the loop. The intermediate language of the loop execution statement is scanned, the array reference node is found, an array name, a subscript expression and a reference state are checked, and the results in the reference table 210 of the array elements in the loop are registered. This process is described below by reference to the example of the intermediate language in FIG. 7. In the intermediate language, the second child of the array element reference node "[ ]" represents a subscript of a dimension which is farther right, and the first child represents a subscript or an array name of a dimension which is farther left. The first child of the assignment node (indicated by "=") represents an assignment destination (definition side), and the second child represents an assignment source (use side). The process is started from the loop execution statement in the example in FIG. 7 since the statement is an assignment statement for node 708. A first child of node 708 is "[ ]" 709, and a second child is "j" 710. A first child of node "[ ]" 709 is "[ ]" 711 again of which a second child is "k" 712. A second right subscript of the array element expression, therefore, is "k". A first child of "[ ]" 711 is "a" 713, which is an array name. These can be summarized: it can be found that the array name of the array reference expression below "=" 709 is "a", the array dimension is two, the subscript expression of the first dimension (leftmost) is "k", and that of the second dimension is "j". The array reference expression is on the definition side as it is the first child of the assignment node "=" 708. An array element reference expression of the second child of the "=" 708 is analyzed in a similar way.

With the analysis described above, we should create an array element reference expression table as shown in FIG. 8. As to the array reference expressions in execution, the array element reference expression table holds the array name 801, the number of dimensions 802, the subscript expression list 803 which is a list of the'subscript expressions of the dimensions, the states of reference for differentiating definition from use and the loop list which is a list of the loop nodes containing the array element expressions.

(Step 103)

Next, step 103 selects the array to be transposed. The step obtains the transposition flag "c" and the dimension "p" for each of the arrays (the array names) occurring in the array element reference table which is to be transposed. The array is not transposed if "c=false" or "p=0". An algorithm for obtaining "c" and "p" for the given array is described below with reference to a flow chart in FIG. 9. As an example, let the array reference expression table in FIG. 8 and the intermediate language in FIG. 7 be used. The transposition flag "c" and the dimension "p" for array "a" are obtained since only array "a" occurs in the table in FIG. 8.

(Step 901)

Let the transposition flag "c" be off and the dimension "p" be 0.

(Step 902)

Step 902 checks whether or not there are any array element reference expressions which are not processed yet for the given array. If not, the process ends. If so, only one of the reference expressions is taken out and control then goes to step 903. First, the first reference expression 806 is taken out since array "a" has two reference expressions.

(Step 903)

Step 903 checks whether or not the subscript list of the reference expression has the control variable for the innermost loop. If not, control returns to step 902. If so, control goes to step 904. The innermost loop is indicated by a loop number of the last (the rightmost) loop in the loop list. Its control variable is indicated by a control variable in the loop table. For the reference expression 806, the last loop in the node list is "1" and the control variable is "k". Control goes to step 904 as the subscript list for the reference has expression 806 has "k" listed first.

(Step 904)

Let the dimension of the subscript expression containing the innermost loop control variable by "q". "q"=1 as the subscript list for the subscript expression 806 has "k" listed first.

(Step 905)

Step 905 checks whether or not "q" is equal to the number of dimensions of the reference expression or if "q" is the rightmost dimension. If so, control goes to "c=false" at step 906 before ending. For the reference expression 806, "q=1" and control goes to step 907 since the number of dimension is 2.

(Step 907)

Step 907 checks whether or not "p=0" or "p=q" has been held. If so, control goes to step 908. If not, control goes to "c=false" at step 906 before ending. For the reference expression, control goes to step 908 as "p=0".

(Step 908)

Step 908 checks whether or not a memory location indicated by the reference expression is accessed two or more times in the loop. If so, "c=true" is made at step 909. If not, "c" is left as it was, and control returns to step 902. Accessing two or more times in the loop is checked by comparing the total number of repetition times of the loops with the number of memory locations indicated by the reference expression. If the former is greater than the latter, it is judged that the accessing is made two or more times. The total number of repetition times of the loops is a multiplication of the repetition times of the loops indicated in the loop list. The number of memory locations indicated by the reference expression is a multiplication of moving ranges of the subscript expressions of all the dimensions. For the reference expression 806, as an example, the total number of repetition times of the loop is 1024*200*300= 61440000. (It is found in the loop table that the numbers of repetition times of the loops 1, 2 and 3 are 1024, 200 and 300, respectively.) The number of memory locations indicated by the reference expression is 300*200=6000. (The subscript expression "k" in the first dimension moves from 0 to 299, and the subscript expression "j" in the second dimension moves from 0 to 199.) Since the former is greater, the memory location indicated by the reference expression 806 is accessed two or more times in the loop. Thus, "c=true".

That ends the process for the reference 806. In turn, control returns to step 902. The reference expression 807 also is similarly processed at step 903 to step 908. Control returns to step 903 again. As there is no reference remained for "a", the process ends. The "a" array is to be transposed since "p=1" and "c=true" at the end of the process.

This ends the description of step 103.

(Step 104)

Next, step 104 generates copy codes for the array to be transposed.

First, an array symbol for a copy destination is generated before being registered in the symbol table. A name of the symbol should be unique, or not coincide with any of the other symbol names. A type of symbol should be array (e, N1, . . . , Nm, . . . , Np) with a type of the array to be transposed being array (e, N1, . . . , Np, . . . Nm) and the dimension to be transposed being "p". FIG. 11 shows the symbol table after an example program was transposed. Since array "a" 605 is to be transposed, a copy destination array symbol "ta" 606 is generated for it. Since the type of "a" is array (int, 300, 200) and "p=1", the type of "ta" becomes array (int, 200, 300). A transposition flag 604 for the array to be transposed is turned on, "ta" is set in a transposition array field 607 and the value "p" is set to 1 in the transposition dimension field 608.

Figure 13:
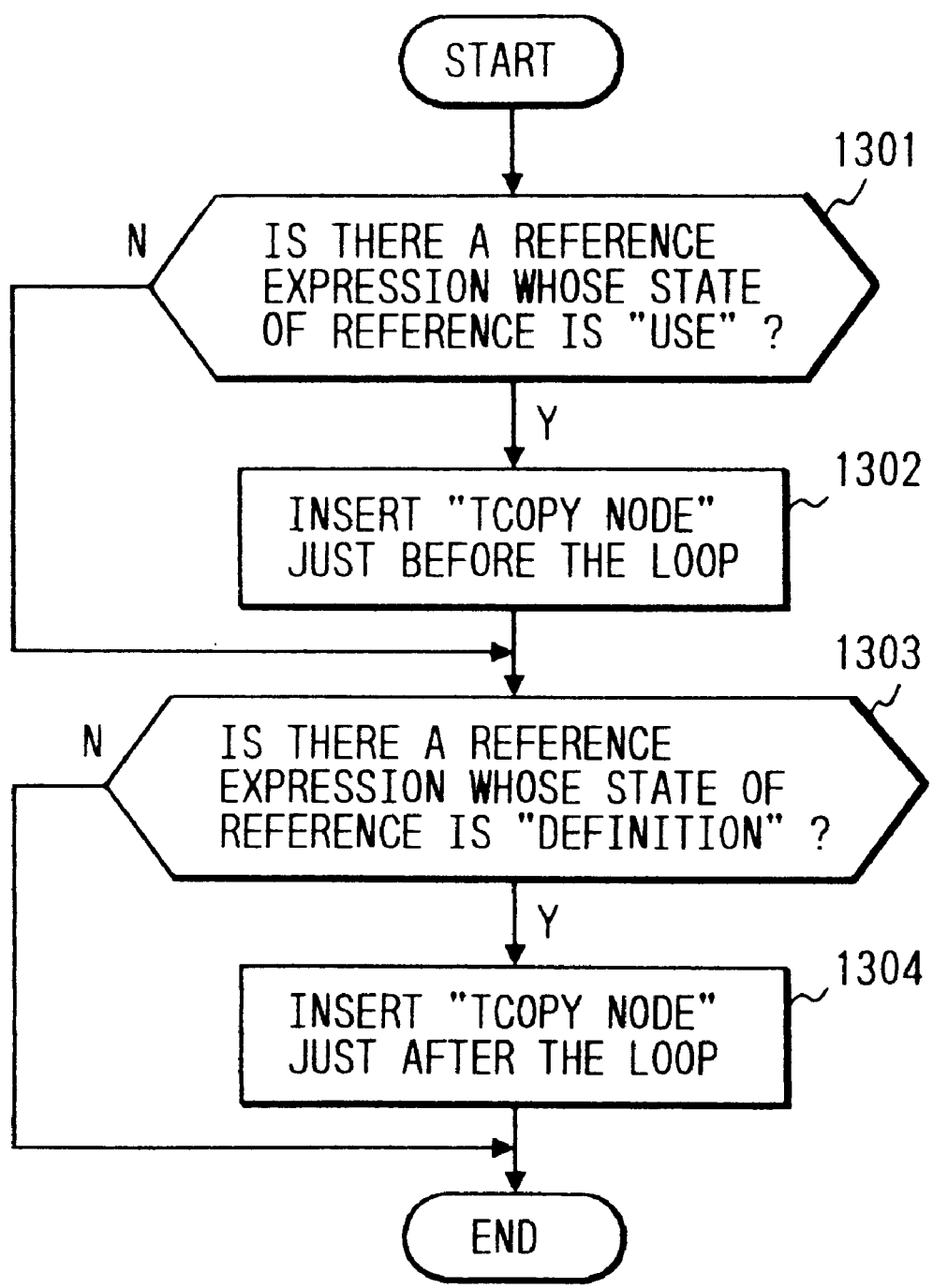
FIG. 13 depicts a flow chart for copy note insertion.

Next, the intermediate language is to be copied while the array to be transposed is transposed to the copy destination array. The copying node during the transposition is "tcopy". A first child of the "tcopy" node is the array name of the copy destination and a second child is the array name of the copy source. This node is inserted just before, after or both, the node representing the loop nest. This process is described below by reference to a flow chart in FIG. 13.

(Step 1301)

Step 1301 checks the reference states of the reference expressions in the array element reference table. If there is at least one reference expression in which the reference state is "use", control goes to step 1302. If not, control goes to step 1303. Since the reference state of the reference expression 807 in the example program in FIG. 8 is "use", control goes to step 1302.

(Step 1302)

Figure 14:
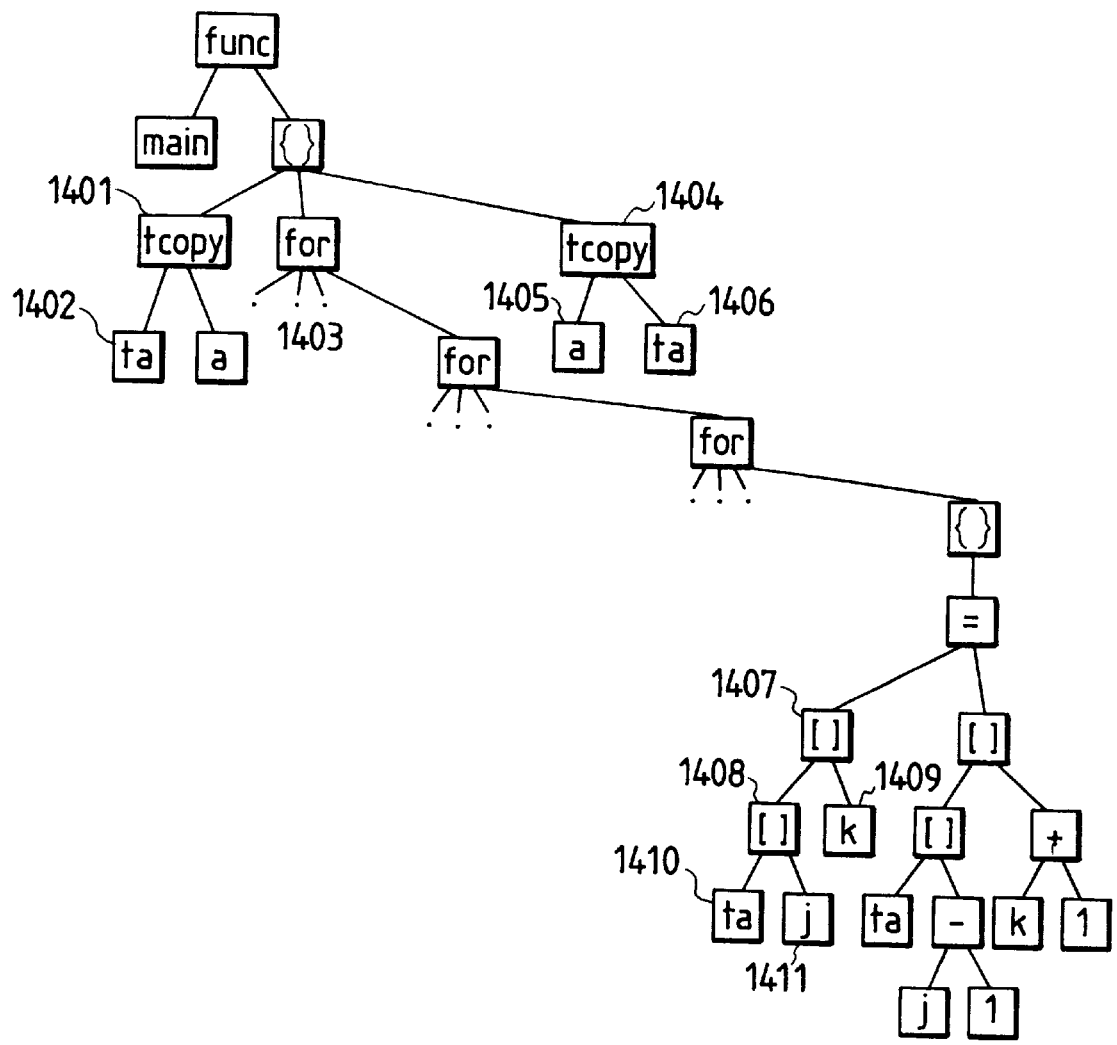
FIG. 14 depicts the intermediate table after transposition.

Step 1302 generates the "tcopy" node in which the newly generated array name is a first child and the array name to be transposed is a second child. The "tcopy" node is inserted just before the loop nest. The case in the example program is shown in FIG. 14. The "tcopy" node 1401 is inserted, its first child is "ta" 1402 and the second child is "a" 1403.

(Step 1303)

Step 1303 checks the reference states of the reference expressions. If there is at least one reference expression in which the reference state is "definition", control goes to step 1304. If not, control ends at step 1303. As the reference state of the reference expression 806 in the example program in FIG. 8 is "definition", control goes to step 1304.

(Step 1304)

Step 1304 generates the "tcopy" node in which the newly generated array name is a second child and the array name to be transposed is a first child. The "tcopy" node is inserted just after the loop nest. The case in the example program also is shown in FIG. 14. The "tcopy" node 1404 is inserted, its second child is "ta" 1406 and the first child is "a" 1405.

FIG. 15 is an image of the C program for the process represented by the "tcopy" node. The figure shows a copy from "a" to "ta" and a copy from "ta" to "a". We may generate the intermediate language corresponding to the program in FIG. 15 in place of the "tcopy" node.

(Step 105)

In turn, step 105 changes the array element reference to a transposition member reference. That is, the intermediate language corresponding to the loop nest is scanned again. If scanning finds a reference to the array element in which the transposition flag is on, it is transposed to an array element reference (copy destination array element reference) after transposition. In the example program, reference "a" is transposed to reference "ta". This process is described below with reference to FIGS. 7, 8 and 14.

In FIG. 7, scanning is started with the "for" node 704 which is to be rewritten. Scanning then finds array "a" at the node 713 in which the transposition flag 604 is on. Array "a" is then transposed to array "ta" indicated in the transposition array 607. This is shown in FIG. 14 (node 1410). The subscript expression represented by the transposition dimension 608, further, is replaced by the rightmost subscript expression. That is, the "k" (first dimension) indicated at the node 712 in FIG. 7 is replaced with the "j" (rightmost dimension) indicated at the node 710. This is shown in FIG. 14 (nodes 1409 and 1411). This ends the first replacement. If scanning the tree is continued, array "a" is found at the node 715 again. Replacement of this array is also made. The results are shown in FIG. 14.

This ends the detailed description of the transposition process at step 303.

FIG. 12 is a source image of the C program which represents the contents of the intermediate language and the symbol table at the end of step 303. (The compiler will not generate and feed out such a program, but can feed out it.) Line 1202 newly declares the copy destination array "ta". This corresponds to the symbol of the entry 606 in the symbol table in FIG. 11. the "tcopy" statements on lines 1206 and 1212 correspond to the nodes represented by the intermediate languages 1401 and 1404. An assignment statement on line 1210 refers to the "ta" array, but not to the "a" array which is different in the order of subscripts from the source program. Following step 303, step 304 (optimization) and step 305 (code generation) are processed as if the C program in FIG. 12 is the source program. This process is the same as the conventional compiler.

The optimization carried out at step 304 includes the conventional optimization called loop unrolling. Loop unrolling rewrites the program so that one loop repetition can execute the repetition of two or more times. This is effective in halving the number of loop end judgements. The program in FIG. 16 is an example of the program in FIG. 4 in which loop unrolling is made as to the innermost loop. In the program in FIG. 16, there are two assignment statements on line 1608 and 1609. The "k" is increased by two as shown on line 1607. The number of loop repetitions is halved. A program in FIG. 17 is the program in FIG. 12 in which loop unrolling has been made in a similar way.

Next, a description of the program with no transposition process and also a description with the transposition process, in view of the array access by reference to FIGS. 16, 17 and 18 follows. Effects of the embodiment then will be described.

Figure 18A:
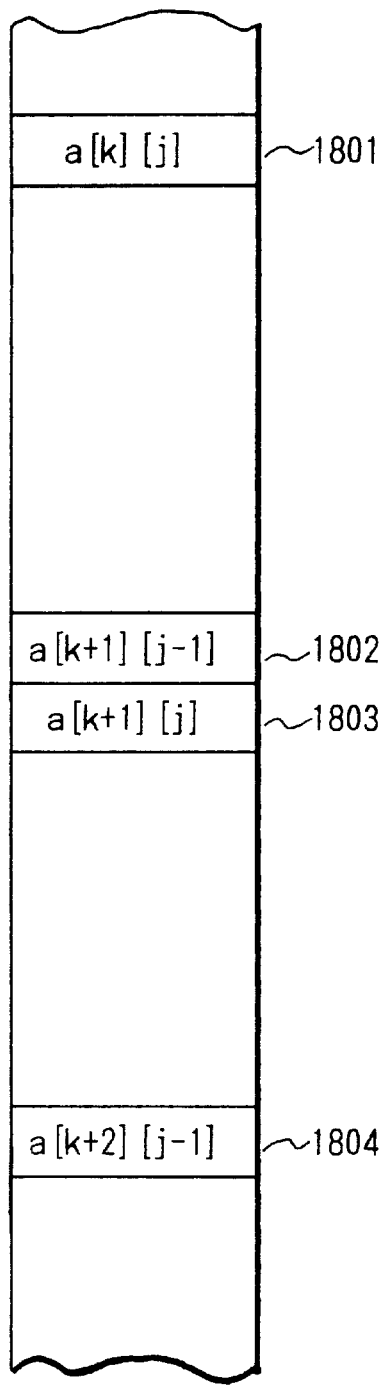
FIG. 18 depicts array element accessed by a loop execution statement.

In the program in FIG. 16, the loop execution statements 1608 and 1609 can access up to four array elements, which include "a[k][j]", "a[k+1][j−1]", "a[k+1][j]" and "a[k+2][j−1]". FIG. 18a shows element positions in the memory. A kind of microprocessor has one read (load) or write (store) instruction that can read or write two or more data continuously arranged in the memory at one time. Of the four elements in FIG. 18, the two elements "a[k+1][j−1]" and "a[k+1][j]" are adjoining. Since the element "a[k+1][j−1]" is used for (load) and the element "a[k+1][j]" is used for definition (store), however, those instructions cannot be used. This is because the other two elements are not adjoining. The loop execution statement needs four instructions in total since each element needs one load or store instruction.

Figure 18B:
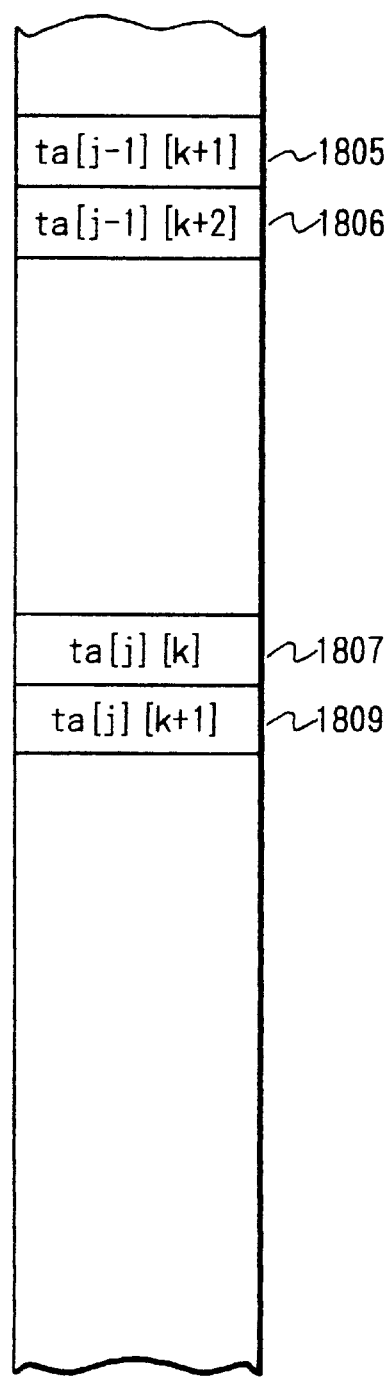

Next, the program, after it is transposed as shown in FIG. 17, is discussed. In the program in FIG. 17, loop execution statement 1709 and 1710 also can access up to four array elements, which include "ta[j][k]", "ta[j][k+1]", "ta[j−1][k+1] and "ta[j−1][k+2]. FIG. 18b shows element positions on the memory. The elements "ta[j][k]" and "ta[j][k+1]" are adjoining and "ta[j−1][k+1]" and "ta[j−1][k+2] are adjoining. Both of the former two are for load, and both of the latter two are for store. The program can use the above-mentioned instruction capable of loading and storing two data at a time, thus requiring only the two instructions.

As described thus far, the embodiment can generate an instruction string that is advantageous for the computer (processor) having the instruction capable of loading and storing two data at a time.

The present invention can generate the object code by using the instruction capable of loading and storing two data at a time since the array elements to be accessed continuously in the loop in time can be continuously accessed in space as well.

The loop conversion method according to the present invention provides the advantage that a similar effect of loop interchange is obtained even for the loop that cannot be interchanged.

The loop conversion method according to the present invention provides the advantage that the replacement can be made only if the overhead of the array copy can be ignored.

What is claimed is:

1. A loop conversion method in an information processing system having a processor and a memory, comprising:

a step performed by said processor, of generating an instruction for accessing data formed of a plurality of source array elements which are arrayed in a plurality of dimensions;

a step performed by said processor of recognizing an accessing process of loop nest within codes containing said instruction;

a step performed by said processor, of transposing and copying the source array elements between at least two positions on different dimensions in said plurality of dimensions, to a one dimensional destination array including at least a continuous array in said memory; and a step performed by said processor, of converting an access of said instruction to said source array elements to an access to said destination array.

2. The loop conversion method according to claim 1, wherein the transposing and copying step further comprises:

a step performed by said processor, of inserting in front of said loop nest a code for transposing and copying all the source elements to said destination array, for executing the transposition and the copy step.

3. The loop conversion method according to claim 2, further comprising:

a step of inserting at back of said loop nest a code for transposing and copying the array destination to the source array.

4. The loop conversion method according to claim 1, wherein the source array elements are in an array in which all the elements are accessed in said loop nest for two or more times.

5. The loop conversion method according to claim 1, wherein the transposing and copying step copies from an n-dimensional source array A to an n-dimensional destination array B so that the relation A (I1, I2, . . . , Ii, . . . , In)=B (Ii, I2, . . . , I1, . . . , In) is satisfied to all the array elements wherein I is a natural number.

6. The loop conversion method according to claim 1, wherein the transposing and copying step copies from an n-dimensional source array A to an n-dimensional destination array B so that the relation A (I1, I2, . . . , Ii, . . . , In)=B (I1, I2, . . . , In, . . . , Ii) is satisfied to all the array elements wherein I is a natural number.

7. The loop conversion method according to claim 1, wherein said loop conversion method is a compiler method.

8. A loop conversion system, comprising:

a processor;

a memory;

means for generating an instruction for accessing data formed of a plurality of source an-ay elements which are arrayed in a plurality of dimensions;

means for recognizing an accessing process of loop nest within codes containing said instruction;

means for transposing and copying the source army elements between at least two positions on different dimensions in said plurality of dimensions, to a one dimensional destination array including at least a continuous array in said memory; and means for converting an access code of said instruction to said source array elements to an access to said destination array.

* * * * *